US 8,430,191 B2

(12) United States Patent
Hashimoto et al.

(10) Patent No.: US 8,430,191 B2
(45) Date of Patent: Apr. 30, 2013

(54) CONTROL APPARATUS FOR ELECTRIC AUTOMOBILE

(75) Inventors: Takenori Hashimoto, Tokyo (JP); Atsushi Namba, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 245 days.

(21) Appl. No.: 12/944,129

(22) Filed: Nov. 11, 2010

(65) Prior Publication Data
US 2011/0115318 A1 May 19, 2011

(30) Foreign Application Priority Data

Nov. 19, 2009 (JP) ................................. 2009-264011

(51) Int. Cl.
*B60W 10/02* (2006.01)
*B60W 10/08* (2006.01)

(52) U.S. Cl.
USPC ...................... 180/65.285; 180/65.275; 477/5

(58) Field of Classification Search ................ 180/65.1, 180/65.21, 65.275, 65.285, 65.31; 477/3, 477/5, 6; 310/66, 75 R, 78
See application file for complete search history.

(56) References Cited

U.S. PATENT DOCUMENTS 7,055,635 B2 *   6/2006   Itoh et al. .................... 180/65.25
7,178,618 B2 *   2/2007   Komeda et al. .......... 180/65.275

FOREIGN PATENT DOCUMENTS

| JP | 2007-331632 A | 12/2007 |
| JP | 2008-239041 A | 10/2008 |

* cited by examiner

*Primary Examiner* — John Walters
(74) *Attorney, Agent, or Firm* — McDermott Will & Emery LLP

(57) ABSTRACT

A clutch mechanism is provided between a drive wheel and an electric motor. In a high vehicle speed region, the electric motor is decoupled from the drive wheel to prevent the electric motor from over-speeding. In the high vehicle speed region, in which the clutch mechanism is switched to a disengaged condition, rotation speed control is executed on the electric motor when a state of charge falls below a predetermined lower limit value, and a motor rotation speed is maintained at a target rotation speed on a lower rotation side than an upper limit rotation speed. Further, the clutch mechanism is switched from the disengaged condition to a slip condition. Hence, a limited power generation torque is supplied to the electric motor, and thus the electric motor can be controlled to a regeneration condition while suppressing the motor rotation speed to or below the upper limit rotation speed.

4 Claims, 5 Drawing Sheets

CONTROL APPARATUS FOR ELECTRIC AUTOMOBILE

CROSS-REFERENCE TO RELATED APPLICATIONS

The present application claims priority from Japanese Patent Application No. 2009-264011 filed on Nov. 19, 2009, the entire contents of which are hereby incorporated by reference.

BACKGROUND OF THE INVENTION

1. Field of the Invention

The present invention relates to a control apparatus for an electric automobile that includes an electric motor coupled to a drive wheel.

2. Description of the Related Art

Hybrid electric automobiles that use both an engine and an electric motor as power sources and electric automobiles that use only an electric motor as a power source have been under development. The electric motor installed in these electric automobiles is coupled to a drive wheel such that a rotation speed of the electric motor varies in conjunction with a vehicle speed. In other words, the rotation speed of the electric motor increases in a high vehicle speed region, and therefore an excessive induced voltage may be generated by the electric motor. In response to this problem, an electric automobile in which a clutch mechanism is provided between the drive wheel and the electric motor so that the electric motor is decoupled from the drive wheel at a high vehicle speed has been proposed (see Japanese Patent Application Laid-open No. 2007-331632 and Japanese Patent Application Laid-open No. 2008-239041, for example). Thus, over-speeding can be prevented from occurring in the electric motor, and as a result, generation of an excessive induced voltage can be prevented.

However, in the electric automobiles described in Japanese Patent Application Laid-open No. 2007-331632 and Japanese Patent Application Laid-open No. 2008-239041, the electric motor is stopped at a high vehicle speed, making power generation impossible. Hence, when the clutch mechanism is disengaged for a long time during high-speed cruising, discharge may be continuously performed, leading to depletion of battery power, and regeneration may be insufficient, leading to a reduction in energy efficiency of the electric automobile.

SUMMARY OF THE INVENTION

An object of the present invention is to ensure that an electric motor can perform power generation in a high vehicle speed region where a clutch mechanism is disengaged.

A control apparatus for an electric automobile according to the present invention is provided with an electric motor coupled to a drive wheel, and includes: a clutch mechanism, provided between the drive wheel and the electric motor, for decoupling the electric motor from the drive wheel in a high vehicle speed region; and clutch control means for controlling the clutch mechanism to a slip condition when the electric motor is controlled to generate electric power in the high vehicle speed region, wherein, when the electric motor is controlled to generate electric power in the high vehicle speed region, a motor rotation speed is suppressed to or below a predetermined upper limit rotation speed.

The control apparatus for an electric automobile according to the present invention further includes motor control means for controlling an operating condition of the electric motor, wherein, when the electric motor is controlled to generate electric power in the high vehicle speed region, the motor control means executes rotation speed control to maintain the motor rotation speed at a predetermined target rotation speed.

In the control apparatus for an electric automobile according to the present invention, when the electric motor is controlled to generate electric power in the high vehicle speed region, the motor control means sets a gain constant of feedback control to be higher than normal.

In the control apparatus for an electric automobile according to the present invention, when the electric motor is controlled to generate electric power in the high vehicle speed region, the clutch control means switches the clutch mechanism to the slip condition and a disengaged condition alternately.

According to the present invention, the clutch mechanism is controlled to the slip condition in the high vehicle speed region where the electric motor is decoupled from the drive wheel, and therefore electric power can be generated while suppressing the motor rotation speed to or below the upper limit rotation speed even in the high vehicle speed region.

DESCRIPTION OF THE PREFERRED EMBODIMENTS

Figure 1:
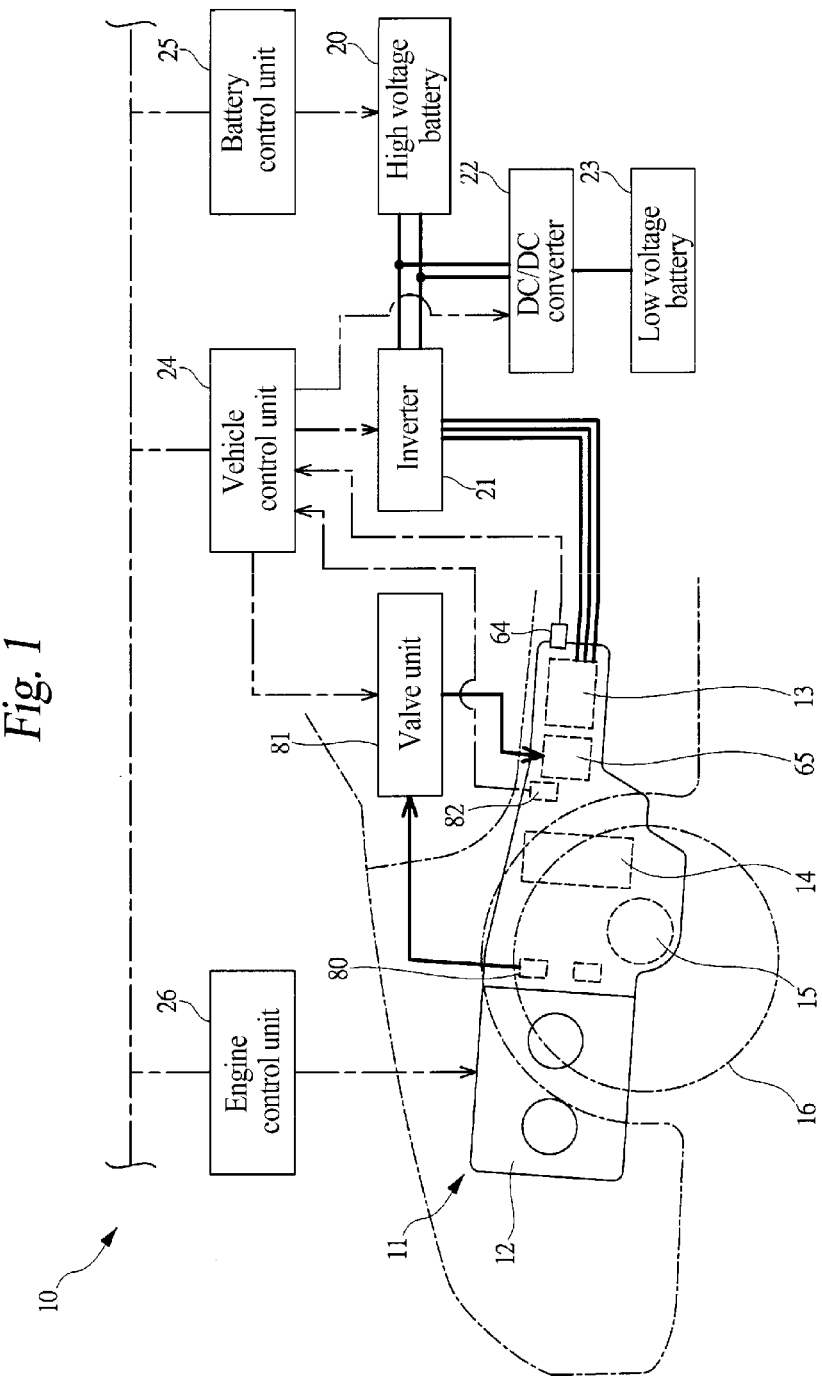
FIG. 1 is a schematic diagram showing a hybrid vehicle.

An embodiment of the present invention will be described in detail below on the basis of the drawings. FIG. 1 is a schematic diagram showing a hybrid vehicle 10. A control apparatus for an electric automobile according to an embodiment of the present invention is provided in the hybrid vehicle 10. As shown in FIG. 1, a power unit 11 is installed longitudinally in a vehicle body. An engine 12 is incorporated into one end portion of the power unit 11, and a motor/generator (electric motor) 13 is incorporated into another end portion of the power unit 11. A continuously variable transmission 14, a differential mechanism 15, and so on are incorporated into the power unit 11 such that engine power and motor power are transmitted to a drive wheel 16 via the differential mechanism 15.

A high voltage battery (a lithium ion battery, for example) 20 is installed in the hybrid vehicle 10 to supply electric power to the motor/generator 13. An inverter 21 is provided between the high voltage battery 20 and the motor/generator 13, and the inverter 21 is constituted by a switching element or the like. When the motor/generator 13 is used as a motor, direct current power from the high voltage battery 20 is converted into alternating current power for the motor/generator 13 via the inverter 21. When the motor/generator 13 is used as a generator, on the other hand, alternating current power from the motor/generator 13 is converted into direct current power for the high voltage battery 20 via the inverter 21. A low voltage battery (a lead storage battery, for example) 23 is connected to the high voltage battery 20 via a DC/DC converter 22, and electric power is supplied to the low voltage battery 23 from the high voltage battery 20 via the converter 22. The low voltage battery 23 functions as a power supply for the inverter 21, the converter 22, and control units 24 to 26 to be described below, and also functions as a power supply for an air-conditioning device, headlights, and so on, not shown in the drawings.

Further, the hybrid vehicle 10 is provided with a vehicle control unit 24 for performing overall control of the hybrid vehicle 10. Various types of information, such as a vehicle speed and an accelerator opening, are input into the vehicle control unit 24, and on the basis of the information, the vehicle control unit 24 outputs control signals to the inverter 21, the converter 22, and so on. The hybrid vehicle 10 is also provided with a battery control unit 25 for controlling charging and discharging of the high voltage battery 20. The battery control unit 25 controls a voltage and current of the high voltage battery 20, and calculates a state of charge SOC, representing a remaining amount of electric power in the high voltage battery 20, on the basis of the voltage, the current, a temperature, and so on. The hybrid vehicle 10 is further provided with an engine control unit 26 for controlling an engine rotation speed and an engine torque. The control units 24 to 26 are constituted by a microcomputer or the like and connected to each other via a communication network.

Figure 2:
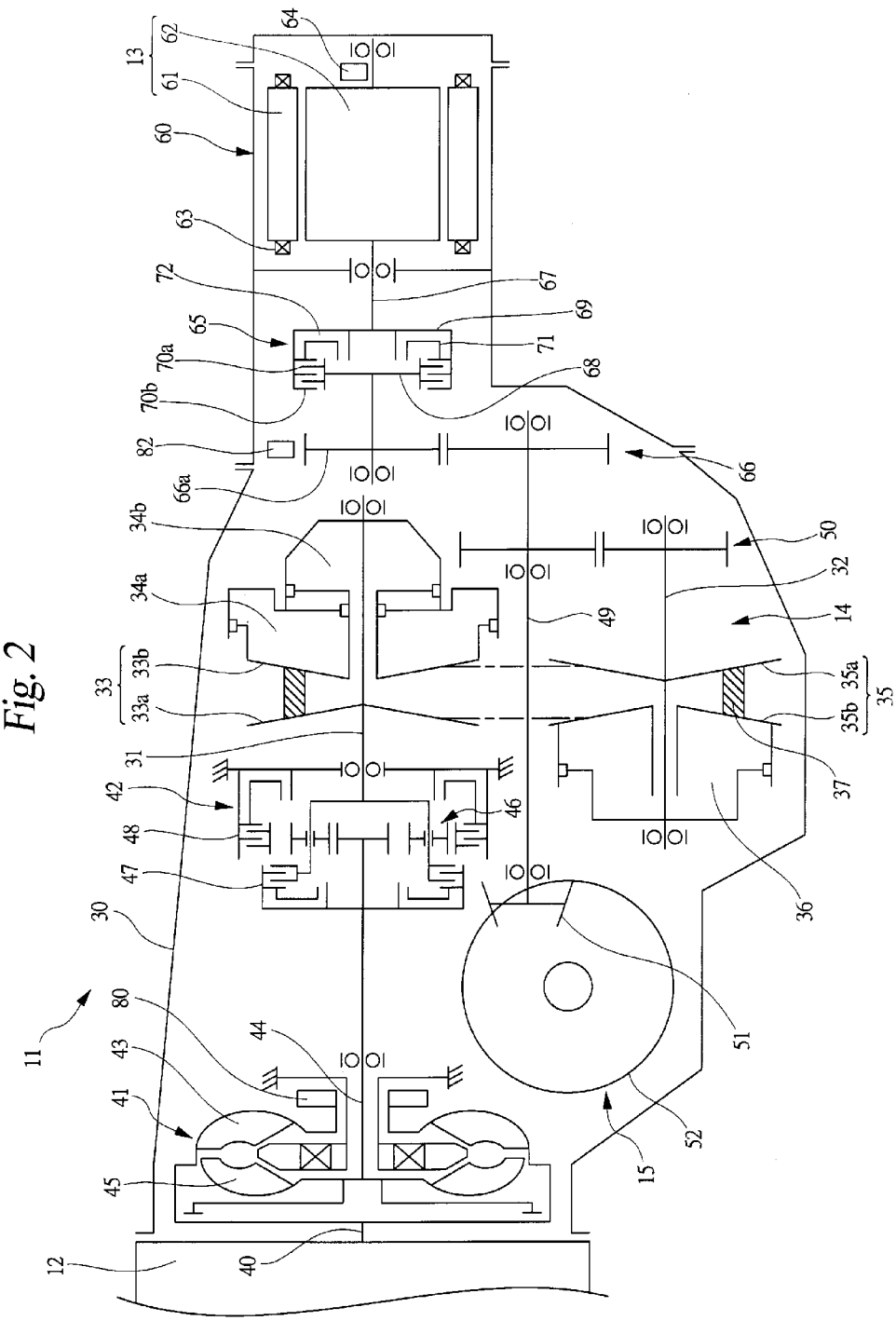
FIG. 2 is a skeleton diagram showing a power unit installed in the hybrid vehicle.

FIG. 2 is a skeleton diagram showing the power unit 11 installed in the hybrid vehicle 10. As shown in FIG. 2, a mission case 30 is attached to the engine 12, and the continuously variable transmission 14 is housed in the mission case 30. The continuously variable transmission 14 includes a primary shaft 31 driven by the engine 12 and a secondary shaft 32 that is parallel to the primary shaft 31. A primary pulley 33 is provided on the primary shaft 31, and the primary pulley 33 includes a fixed sheave 33a and a movable sheave 33b. Primary oil chambers 34a and 34b are defined on a back surface side of the movable sheave 33b, and by regulating a pressure in the primary oil chambers 34a and 34b, a pulley groove width can be varied. A secondary pulley 35 is provided on the secondary shaft 32, and the secondary pulley 35 includes a fixed sheave 35a and a movable sheave 35b. A secondary oil chamber 36 is defined on a back surface side of the movable sheave 35b, and by regulating a pressure in the secondary oil chamber 36, a pulley groove width can be varied. Further, by varying the groove width of the pulleys 33 and 35 to vary a winding diameter of a drive chain 37, the primary shaft 31 can be shifted continuously relative to the secondary shaft 32.

A torque converter 41 and a forward/reverse switching mechanism 42 are provided between a crankshaft 40 and the primary shaft 31 in order to transmit the engine power to the continuously variable transmission 14. The torque converter 41 includes a pump impeller 43 coupled to the crankshaft 40, and a turbine runner 45 that is disposed opposite the pump impeller 43 and coupled to a turbine shaft 44. The forward/reverse switching mechanism 42 includes a double pinion type planetary gear train 46, a forward clutch 47, and a reverse brake 48. By controlling the forward clutch 47 and the reverse brake 48, an engine power transmission path can be switched, and as a result, a rotation direction of the primary shaft 31 can be switched. Further, a transmission output shaft 49 is housed in the mission case 30 parallel to the secondary shaft 32, and the transmission output shaft 49 is coupled to the secondary shaft 32 via a gear train 50. Furthermore, a pinion gear 51 is fixed to an end portion of the transmission output shaft 49, and the pinion gear 51 is meshed to a ring gear 52 of the differential mechanism 15. Hence, the continuously variable transmission 14 and the differential mechanism 15 are coupled via the transmission output shaft 49 such that the engine power output from the continuously variable transmission 14 is transmitted to the differential mechanism 15 via the transmission output shaft 49.

Further, a motor case 60 is attached to the mission case 30, and the motor/generator 13 is housed in the motor case 60. The motor/generator 13 includes a stator 61 fixed to the motor case 60 and a rotor 62 accommodated on an inner side of the stator 61 to be free to rotate. The motor/generator 13 shown in the drawings is a permanent magnet synchronous motor (a PM motor) in which a stator coil 63 is wound around the stator 61 and a permanent magnet is incorporated into the rotor 62. To control the motor/generator 13, the vehicle control unit 24 functioning as the motor control means sets a target torque on the basis of an accelerator opening, a motor rotation speed, and so on. The vehicle control unit 24 then outputs a pulse signal corresponding to the target torque to the inverter 21, whereupon the inverter 21 supplies alternating current to each phase line of the stator coil 63. The vehicle control unit 24 detects a value of the current supplied to each phase line and feedback-controls the pulse signal, and as a result, the motor/generator 13 is controlled to output the target torque. Note that a rotation position sensor 64 such as a resolver is provided on the rotor 62 of the motor/generator 13 to detect a rotation angle of the rotor 62. The rotation angle is used for coordinate conversion between a three-phase fixed coordinate system (u-v-w) and a rotating coordinate system (d-q).

Figure 3:
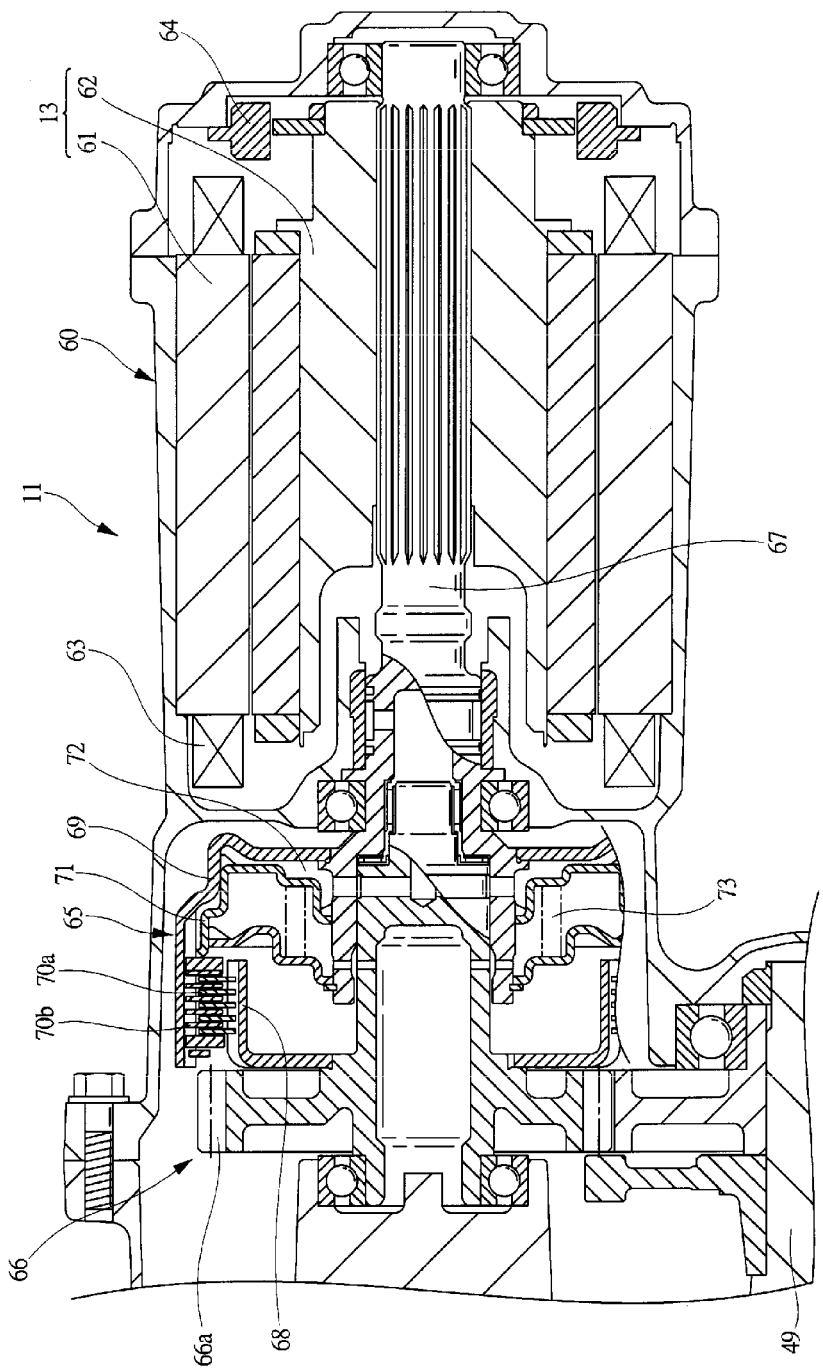
FIG. 3 is an enlarged sectional view of a clutch mechanism provided in the power unit.

Further, a clutch mechanism 65 and a gear train 66 are provided between the motor/generator 13 and the transmission output shaft 49, and the motor power is transmitted to the transmission output shaft 49 via the clutch mechanism 65 and the gear train 66. FIG. 3 is an enlarged sectional view of the clutch mechanism 65 provided in the power unit 11. As shown in FIG. 3, the clutch mechanism 65 includes a clutch hub 68 fixed to a motor shaft 67 that extends from the rotor 62, and a clutch drum 69 coupled to a drive gear 66a of the gear train 66. A plurality of friction plates 70a are attached to the clutch hub 68, and a plurality of friction plates 70b are attached to the clutch drum 69. Further, a piston 71 is housed in the clutch drum 69, and a clutch oil chamber 72 is defined by the clutch drum 69 and the piston 71. When working oil is supplied to the clutch oil chamber 72, the piston 71 is pushed out by oil pressure, and as a result, the friction plates 70a and 70b are pushed against each other such that the clutch mechanism 65 is switched to an engaged condition. When the working oil is discharged from the clutch oil chamber 72, on the other hand, the piston 71 is pushed back by a spring member 73, and therefore the engagement between the friction plates 70a and 70b is released such that the clutch mechanism 65 is switched to a disengaged condition. Note that by regulating a clutch pressure supplied to the clutch oil chamber 72, a slip condition, in which torque is transmitted while causing the friction plates 70a and 70b to slip, can be established.

In order to control the supply of working oil to the clutch oil chamber 72 of the clutch mechanism 65, an oil pump 80 driven by the engine 12 is provided in the power unit 11 as shown in FIG. 2, and a valve unit 81 is provided between the oil pump 80 and the clutch mechanism 65 as shown in FIG. 1. The valve unit 81 is constituted by solenoid control valves such as an oil passage switching valve and a pressure control valve, and operating conditions of the solenoid control valves are controlled by the vehicle control unit 24 functioning as the clutch control means. In a low/medium vehicle, speed region where the motor rotation speed is no higher than a predetermined upper limit rotation speed, the clutch mechanism 65 is switched to the engaged condition by the vehicle control unit 24 such that the motor/generator 13 is coupled to the drive wheel 16. In a high vehicle speed region where the motor rotation speed exceeds the upper limit rotation speed, on the other hand, the clutch mechanism 65 is switched to the disengaged condition by the vehicle control unit 24 such that the motor/generator 13 is decoupled from the drive wheel 16. Note that the vehicle control unit 24 calculates the motor rotation speed on the basis of a signal from the rotation position sensor 64.

Hence, in the high vehicle speed region, the motor/generator 13 is decoupled from the drive wheel 16 rotating at a high speed, and therefore over-speeding can be prevented from occurring in the motor/generator 13, whereby generation of an excessive induced voltage can be prevented. As a result, a withstand voltage of the inverter 21 can be suppressed low, enabling a reduction in the cost of a power control system. Further, by decoupling the motor/generator 13 at a high vehicle speed, an amount of power consumed during field weakening control can be suppressed, and therefore a power consumption of the hybrid vehicle 10 can be suppressed. Moreover, by decoupling the motor/generator 13 at a high vehicle speed, power loss caused by rotation resistance of the rotor 62 can be suppressed.

Next, power generation control performed with respect to the motor/generator 13 will be described. As noted above, the motor/generator 13 is decoupled from the drive wheel 16 in the high vehicle speed region in order to protect the inverter 21 and so on. However, the motor/generator 13 functions as a power generator, and therefore, when the clutch mechanism 65 is continuously disengaged in the high vehicle speed region, a power generation operation of the motor/generator 13 is limited. More specifically, when the clutch mechanism 65 is continuously disengaged for a long time during high-speed cruising or the like, discharge may be continuously performed, leading to depletion of the power of the high voltage battery 20 and low voltage battery 23, and as a result, it may be difficult for the hybrid vehicle 10 to maintain a favorable traveling performance. In response to this problem, the control apparatus for an electric automobile according to the embodiment of the present invention controls the clutch mechanism 65 to a slip condition in the high vehicle speed region, thereby enabling power generation control of the motor/generator 13 without causing the motor/generator 13 to over-speed.

Figure 4:
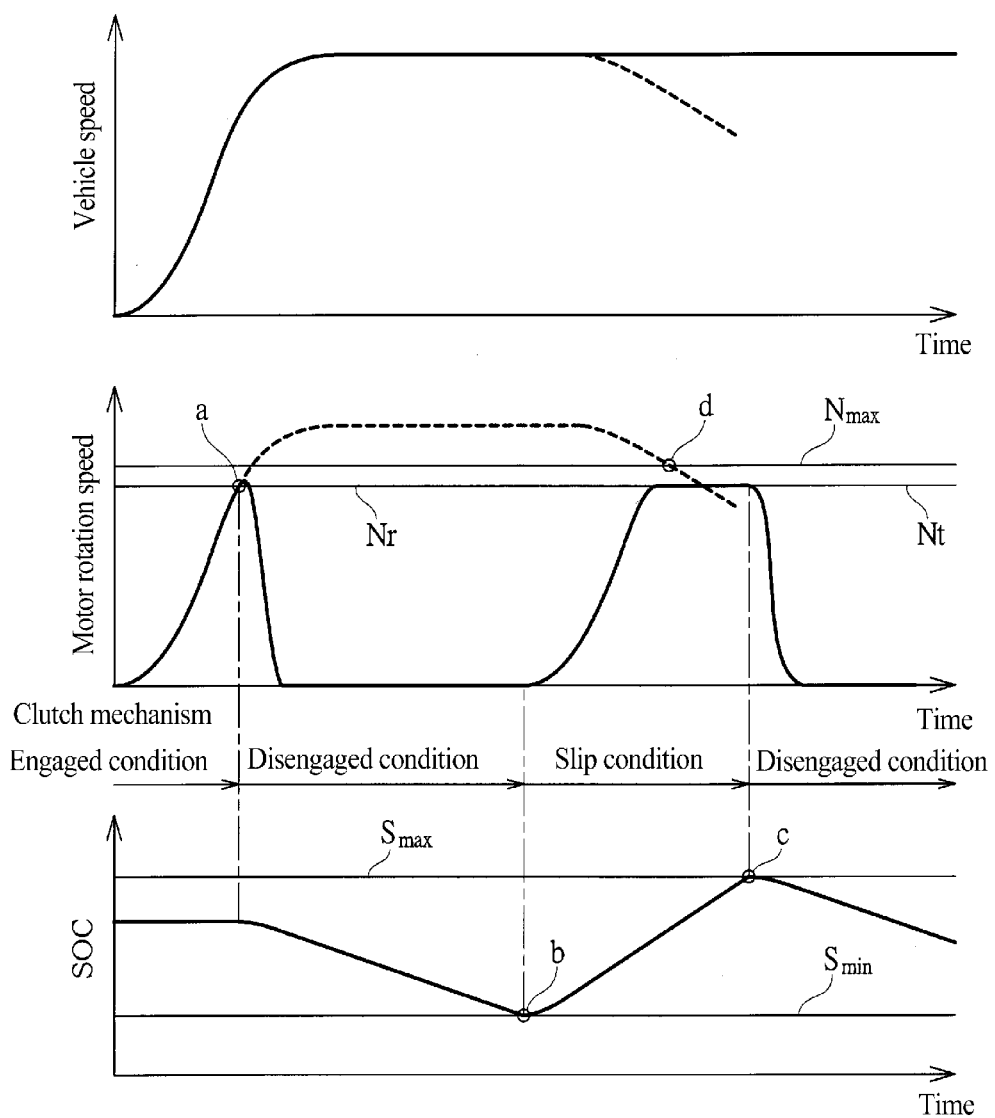
FIG. 4 is an illustrative view showing operating conditions of a motor/generator and the clutch mechanism in a high vehicle speed region.

FIG. 4 is an illustrative view showing operating conditions of the motor/generator 13 and the clutch mechanism 65 in the high vehicle speed region. As shown in FIG. 4, in the low/medium vehicle speed region, the clutch mechanism 65 is engaged, and therefore the motor rotation speed varies in conjunction with the vehicle speed. When the hybrid vehicle 10 enters the high vehicle speed region such that the motor rotation speed exceeds a predetermined disengagement rotation speed Nr (reference symbol a), the clutch mechanism 65 is switched to the disengaged condition and the motor/generator 13 is decoupled from the drive wheel 16. As described above, the motor/generator 13 cannot generate power when the clutch mechanism 65 is in the disengaged condition, and therefore the state of charge SOC of the high voltage battery 20 gradually decreases.

When the state of charge SOC falls below a predetermined lower limit value $S_{min}$ (reference symbol b), rotation speed control is executed on the motor/generator 13 such that the motor rotation speed is held at a target rotation speed Nt on a lower rotation side than an upper limit rotation speed $N_{max}$. In this rotation speed control, a gain constant of feedback control is set to be higher than that of normal torque control executed in the low/medium vehicle speed region. Further, a predetermined clutch pressure set in advance is supplied to the clutch oil chamber 72 such that the clutch mechanism 65 is switched from the disengaged condition to the slip condition. As a result, a limited power generation torque is supplied to the motor/generator 13 from the transmission output shaft 49, making it possible to control the motor/generator 13 to a regeneration condition. Since the rotation speed control is performed on the motor/generator 13 at this time, the motor rotation speed does not exceed the upper limit rotation speed $N_{max}$. Moreover, since the gain constant of the feedback control is set to be high during the rotation speed control, a responsiveness of the motor/generator 13 can be increased, making it possible to reliably prevent the motor/generator 13 from over-speeding. When the state of charge SOC, which increases as a result of the power generation, reaches a predetermined upper limit value $S_{max}$ (reference symbol c), power generation by the motor/generator 13 is no longer required, and therefore the rotation speed control performed on the motor/generator 13 is halted and the clutch mechanism 65 is switched back to the disengaged condition. Note that the upper limit rotation speed $N_{max}$ of the motor/generator 13 is an allowable upper limit value of the motor rotation speed set on the basis of a withstand voltage capacity of the inverter 21, a mechanical strength of the rotor 62, and so on.

Hence, in the high vehicle speed region, the clutch mechanism 65 is controlled to the slip condition, and therefore the motor/generator 13 can be controlled to the regeneration condition (power generation condition) while suppressing the motor rotation speed. Moreover, the motor/generator 13 is controlled to maintain the target rotation speed Nt, and therefore over-speeding can be reliably prevented from occurring in the motor/generator 13. Since the motor/generator 13 can be controlled to the regeneration condition even in the high vehicle speed region, the state of charge SOC of the high voltage battery 20 can be held within an appropriate range, and therefore a favorable traveling performance can be secured in the hybrid vehicle 10 in the high vehicle speed region. Moreover, a regeneration range of the motor/generator 13 can be extended to the high vehicle speed region, and therefore an improvement in the fuel efficiency of the hybrid vehicle 10 can be achieved. Furthermore, since the state of charge SOC of the high voltage battery 20 can be held within an appropriate range, an alternator for charging the low voltage battery 23 can be omitted, and therefore a low voltage system can be simplified.

In the above description, slip control of the clutch mechanism 65 is canceled when the state of charge SOC reaches the predetermined upper limit value $S_{max}$, but the present invention is not limited thereto. For example, as shown by a dotted line in FIG. 4, slip control of the clutch mechanism 65 may be canceled when the motor rotation speed falls below the upper limit rotation speed $N_{max}$ as the vehicle speed decreases during clutch engagement (reference symbol d), whereupon the clutch mechanism 65 is switched from the slip condition to the engaged condition. Further, in the case shown in FIG. 4, the disengagement rotation speed Nr and the target rotation speed Nt are identical, but the present invention is not limited thereto, and the disengagement rotation speed Nr and the target rotation speed Nt may be set at different rotation values. The target rotation speed Nt of the motor/generator 13 is preferably set in the vicinity of the upper limit rotation speed $N_{max}$ to suppress an amount of slippage in the clutch mechanism 65 and improve the durability thereof.

Further, as shown in FIGS. 1 and 2, a rotation sensor 82 for detecting the rotation speed of the drive gear 66a is provided in the power unit 11, and the rotation sensor 82 can be used to detect a drive-wheel-side rotation speed of the clutch mechanism 65. The vehicle control unit 24 calculates the slippage amount of the clutch mechanism 65 by subtracting a motor-side rotation speed (the motor rotation speed) of the clutch mechanism 65 from the drive-wheel-side rotation speed of the clutch mechanism 65. Further, the vehicle control unit 24 calculates a transmission torque of the clutch mechanism 65 on the basis of a clutch pressure supplied to the clutch oil chamber 72. The vehicle control unit 24 also calculates a heat generation amount of the clutch mechanism 65 by multiplying the slippage amount by the transmission torque, and calculates an integrated value of the heat generation amount during the slip control. When the heat generation amount exceeds a preset upper limit value or the integrated value of the heat generation amount exceeds a preset upper limit value, the vehicle control unit 24 cancels the slip control and switches the clutch mechanism 65 to the disengaged condition. As a result, seizing of the clutch mechanism 65 can be forestalled, enabling an improvement in the durability of the clutch mechanism 65.

Figure 5:
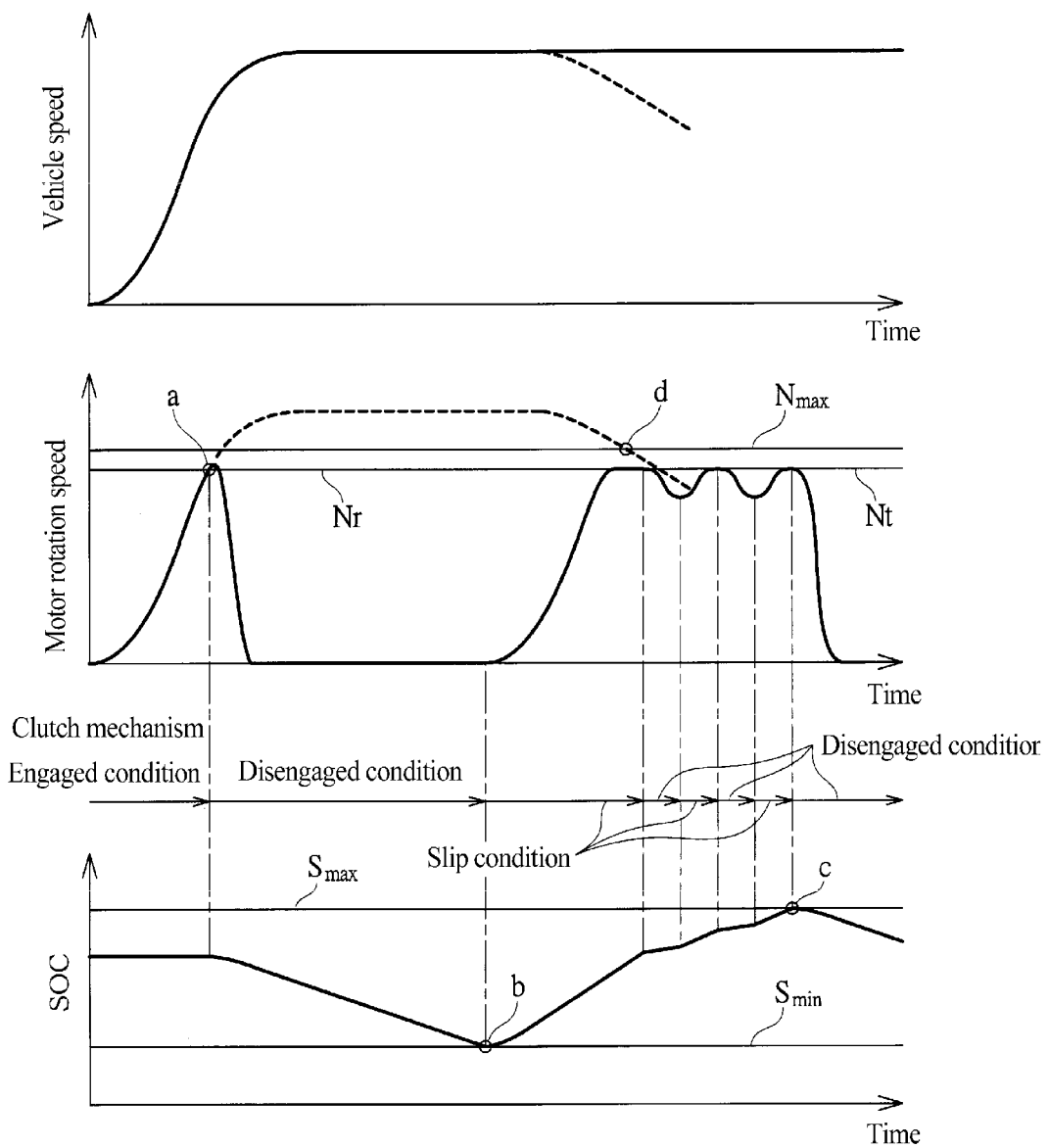
FIG. 5 is an illustrative view showing operating conditions of the motor/generator and the clutch mechanism in the high vehicle speed region.

In the above description, the motor/generator 13 is controlled to the regeneration condition while holding the clutch mechanism 65 in the slip condition when the state of charge SOC decreases in the high vehicle speed region, but the present invention is not limited thereto, and the clutch mechanism 65 may be switched between the slip condition and the disengaged condition intermittently. FIG. 5 is an illustrative view showing operating conditions of the motor/generator 13 and the clutch mechanism 65 in the high vehicle speed region. As shown in FIG. 5, when the hybrid vehicle 10 enters the high vehicle speed region such that the motor rotation speed exceeds the predetermined disengagement rotation speed Nr (reference symbol a), the clutch mechanism 65 is switched to the disengaged condition and the motor/generator 13 is decoupled from the drive wheel 16. When the clutch mechanism 65 is in the disengaged condition, the motor/generator 13 cannot generate power, and therefore the state of charge SOC of the high voltage battery 20 gradually decreases.

When the state of charge SOC falls below the predetermined lower limit value $S_{min}$ (reference symbol b), the rotation speed control is executed on the motor/generator 13 such that the motor rotation speed is held at the target rotation speed Nt on the lower rotation side than the upper limit rotation speed $N_{max}$. In the rotation speed control, the gain constant of the feedback control is set to be higher than that of the normal torque control executed in the low/medium vehicle speed region. Further, a predetermined clutch pressure set in advance is supplied to the clutch oil chamber 72 such that the clutch mechanism 65 is switched from the disengaged condition to the slip condition. When the slip condition has been established in the clutch mechanism 65 continuously for a predetermined time, intermittent control is executed on the clutch mechanism 65. The intermittent control of the clutch mechanism 65 is a control that switches the clutch mechanism 65 to the slip condition and the disengaged condition alternately.

Hence, power generation torque is supplied to the motor/generator 13 from the transmission output shaft 49 even when the clutch mechanism 65 is switched to the slip condition and the disengaged condition alternately in this manner, and therefore the motor/generator 13 can be controlled to the regeneration condition. Moreover, by switching the clutch mechanism 65 to the slip condition and the disengaged condition alternately, the clutch mechanism 65 can be prevented from generating excessive heat, and as a result, the durability of the clutch mechanism 65 can be improved. The period in which the clutch mechanism 65 is held in the slip condition and the disengaged condition during the intermittent control is set on the basis of the heat generation amount of the clutch mechanism 65. For example, when the heat generation amount is small, the period in which the clutch mechanism 65 is held in the slip condition is set to be long, and when the heat generation amount is large, the period in which the clutch mechanism 65 is held in the disengaged condition is set to be long. As noted above, the heat generation amount of the clutch mechanism 65 is calculated by multiplying the slippage amount of the clutch mechanism 65 by the transmission torque.

Note that the motor/generator 13 may be caused to generate electric power only when the clutch mechanism 65 is switched to the slip condition, or the motor/generator 13 may be caused to generate electric power continuously during the period in which the clutch mechanism 65 is intermittently switched between the slip condition and the disengaged condition. Further, as described above, when the state of charge SOC reaches the predetermined upper limit value $S_{max}$ (reference symbol c) or the motor rotation speed falls below the upper limit rotation speed $N_{max}$ as the vehicle speed decreases during clutch engagement (reference symbol d), the rotation speed control performed on the motor/generator 13 is halted and the clutch mechanism 65 is switched back to the disengaged condition.

The present invention is not limited to the embodiment described above and may be subjected to various modifications within a scope that does not depart from the spirit thereof. In the above description, the present invention is applied to the hybrid vehicle 10, but the present invention may be applied to an electric automobile that uses only an electric motor as a power source. Further, a permanent magnet synchronous motor is employed as the electric motor, but the present invention is not limited thereto, and another type of synchronous motor or an induction motor may be used instead.

What is claimed is:

1. A control apparatus for a hybrid electric automobile that is provided with an electric motor coupled to a drive wheel, the control apparatus comprising:
  a clutch mechanism, provided between the drive wheel and the electric motor, for decoupling the electric motor from the drive wheel in a high vehicle speed region; and
  clutch control means for controlling the clutch mechanism to a slip condition when the electric motor is controlled to generate power in the high vehicle speed region,
  wherein, when the electric motor is controlled to generate power in the high vehicle speed region, a motor rotation speed is suppressed to or below a predetermined upper limit rotation speed.

2. The control apparatus according to claim 1, further comprising motor control means for controlling an operating condition of the electric motor,
  wherein, when the electric motor is controlled to generate power in the high vehicle speed region, the motor control means executes rotation speed control to maintain the motor rotation speed at a predetermined target rotation speed.

3. The control apparatus according to claim 2, wherein, when the electric motor is controlled to generate power in the high vehicle speed region, the motor control means sets a gain constant of feedback control to be higher than normal.

4. The control apparatus according to claim 1, wherein, when the electric motor is controlled to generate power in the high vehicle speed region, the clutch control means switches the clutch mechanism to the slip condition and a disengaged condition alternately.

* * * * *